(12) United States Patent  
Muraguchi

(10) Patent No.: US 8,015,804 B2  
(45) Date of Patent: Sep. 13, 2011

(54) SECONDARY AIR SUPPLY APPARATUS AND CONTROL METHOD FOR THE SAME

(75) Inventor: Tomokazu Muraguchi, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1138 days.

(21) Appl. No.: 10/578,747

(22) PCT Filed: Aug. 15, 2005

(86) PCT No.: PCT/IB2005/002607  
§ 371 (c)(1), (2), (4) Date: May 10, 2006

(87) PCT Pub. No.: WO2006/024935  
PCT Pub. Date: Mar. 9, 2006

(65) Prior Publication Data  
US 2007/0137185 A1   Jun. 21, 2007

(30) Foreign Application Priority Data  
Aug. 30, 2004   (JP) ................................ 2004-249914

(51) Int. Cl.  
*F01N 3/00* (2006.01)  
*F01N 3/10* (2006.01)

(52) U.S. Cl. ................. 60/289; 80/277; 80/304; 80/305

(58) Field of Classification Search .................... 60/273, 60/277, 287–294, 304, 305, 307, 274  
See application file for complete search history.

(56) References Cited

U.S. PATENT DOCUMENTS  
5,319,928 A * 6/1994 Bone et al. ...................... 60/274  
(Continued)

FOREIGN PATENT DOCUMENTS  
JP   03-286121 A   12/1991  
(Continued)

OTHER PUBLICATIONS  
Hirooka et al, Machine Translation of JP 2003-314263 A, published Nov. 6, 2003.*

*Primary Examiner* — Thomas Denion  
*Assistant Examiner* — Audrey Klasterka  
(74) *Attorney, Agent, or Firm* — Kenyon & Kenyon LLP

(57) ABSTRACT

An ECU executes (300) a program including a step (S202) of opening an electromagnetic ASV (232) while a vacuum pressure ASV (1) and a vacuum pressure ASV (2) are controlled so as to be closed, and an air pump (200) is controlled so as to be stopped in a case where an air amount GA that is an amount of air introduced into an engine (100) is equal to or larger than a predetermined air amount GA (0), and a coolant temperature TW at the starting time of the engine is equal to or higher than a predetermined coolant temperature TW (0) ("YES" in step S200); a step (S204) of detecting a pressure; a step (S206) of closing the electromagnetic ASV; and a step (S402) of determining that failure has occurred in at least one of the vacuum pressure ASV (1) and the vacuum pressure ASV (2), that is, one of the vacuum pressure ASV (1) and the vacuum pressure ASV (2) remains in an opened state and cannot be closed when there is a pulsation of the pressure that is detected while the electromagnetic ASV is opened ("YES" in step S400).

5 Claims, 4 Drawing Sheets

U.S. PATENT DOCUMENTS

2004/0011027 A1 * 1/2004 Hirooka et al. ............ 60/289
2004/0107693 A1   6/2004 Bayerle et al.

FOREIGN PATENT DOCUMENTS

| JP | 05-179936 A | 7/1993 |
| JP | 08-200541 A | 8/1996 |
| JP | 09-021312 A | 1/1997 |
| JP | 09-125945 A | 5/1997 |
| JP | 10-077825 A | 3/1998 |
| JP | 2002-266707 A | 9/2002 |
| JP | 2003-083048 A | 3/2003 |
| JP | 2003-314263 A | 11/2003 |
| JP | 2003314263 A * | 11/2003 |
| JP | 2004-011585 A | 1/2004 |

* cited by examiner

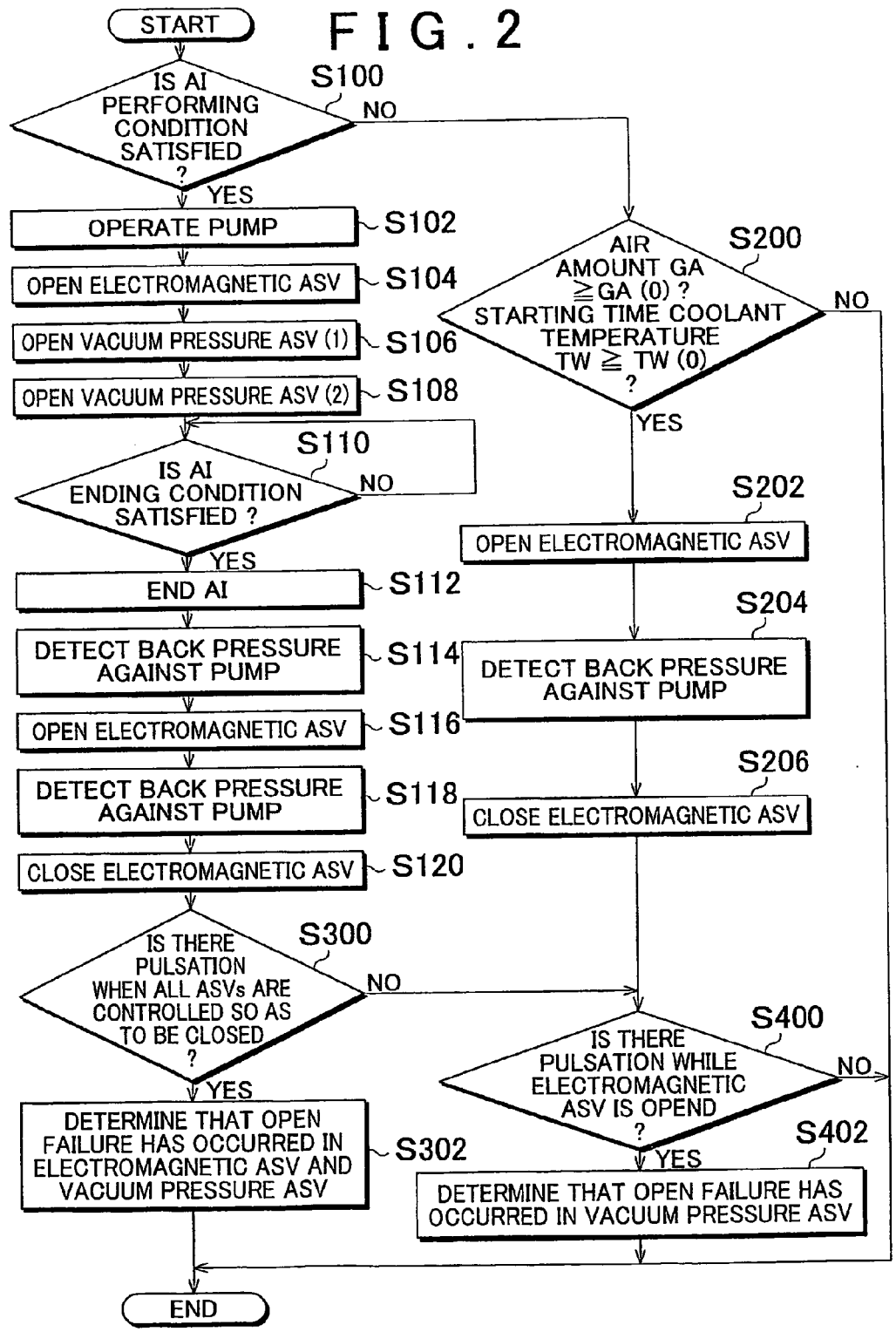

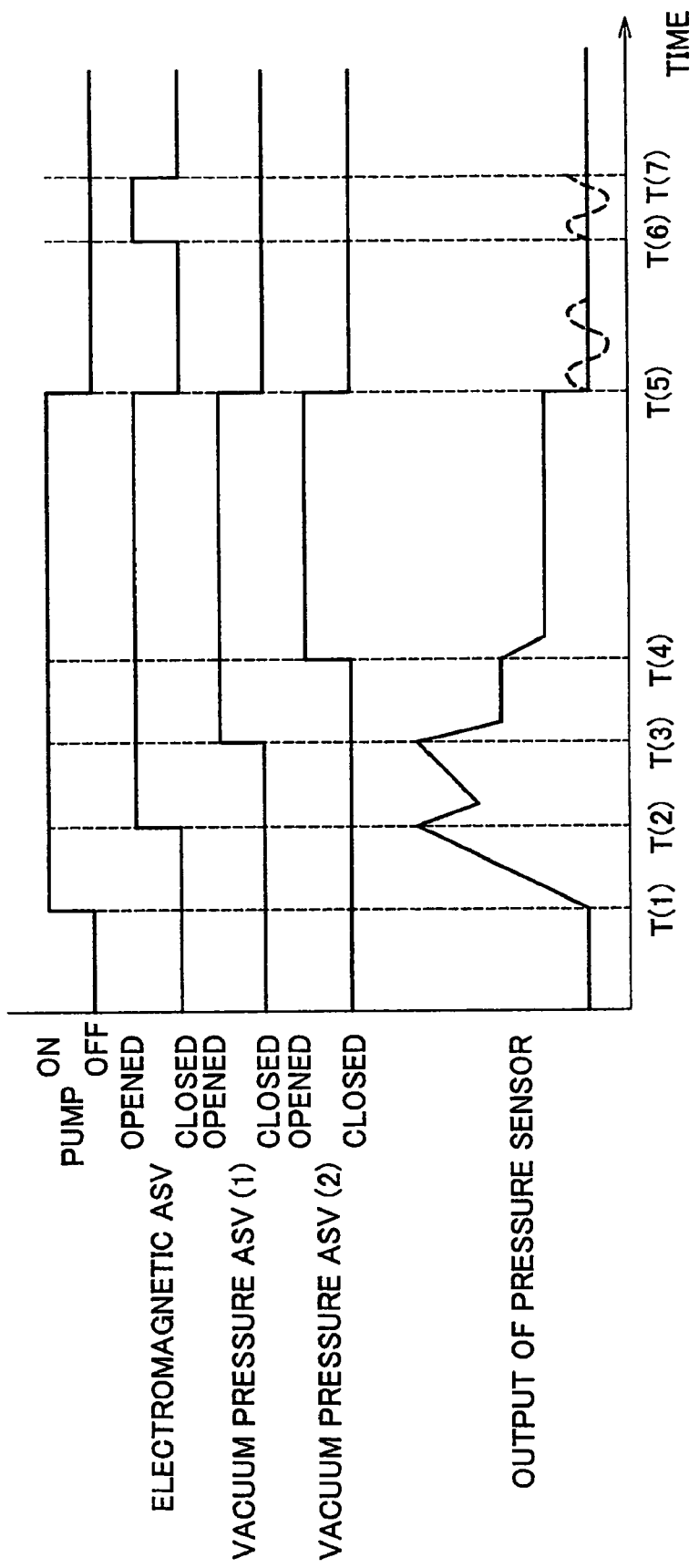

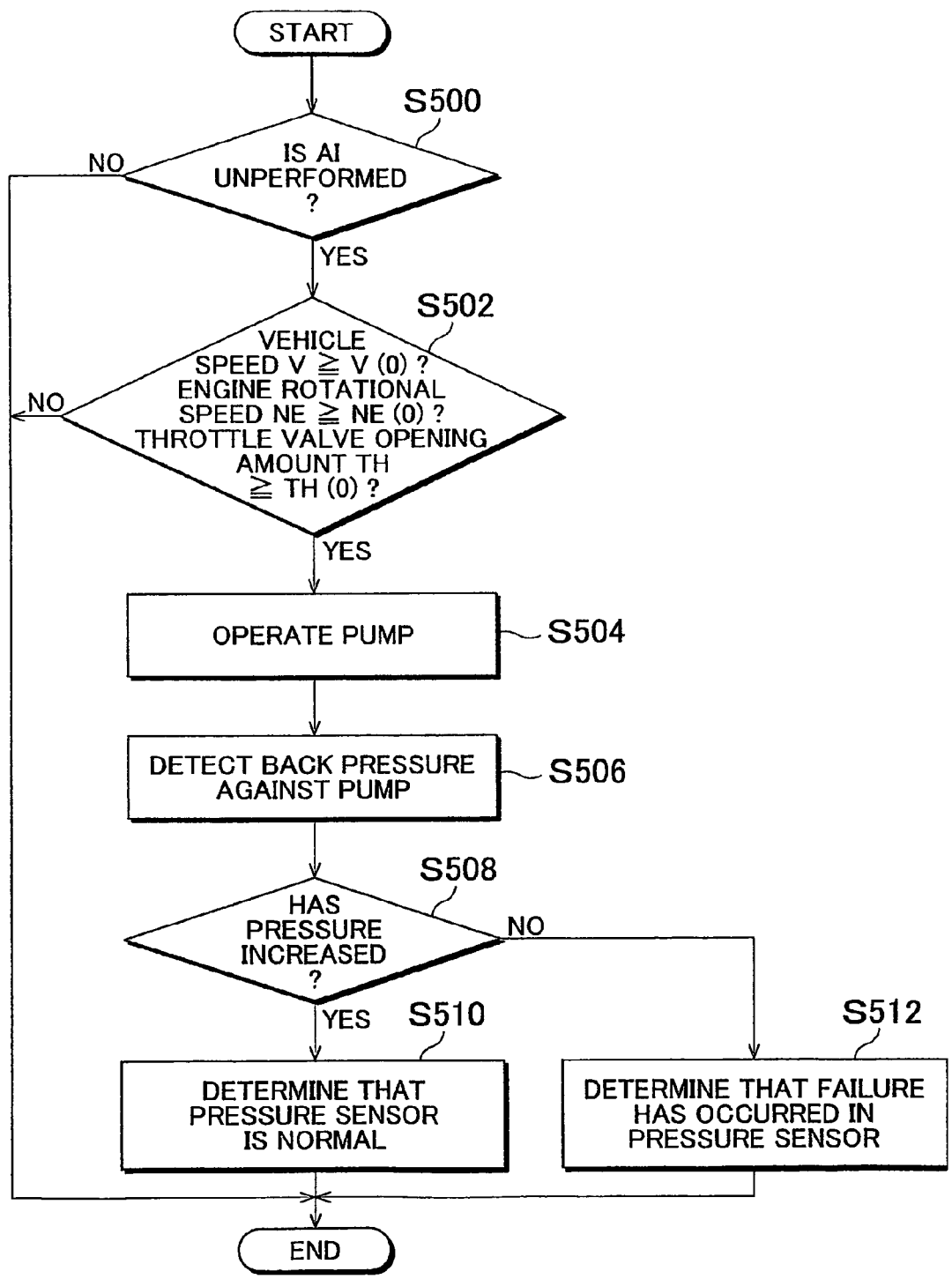

SECONDARY AIR SUPPLY APPARATUS AND CONTROL METHOD FOR THE SAME

This is a 371 national phase application of PCT/IB2005/002607 filed 15 Aug. 2005, claiming priority to Japanese Patent Application No. JP 2004-249914 filed 30 Aug. 2004, the contents of which are incorporated herein by reference.

BACKGROUND OF THE INVENTION

1. Field of the Invention

The invention relates to a secondary air supply apparatus and a control method for the same. More specifically, the invention relates to a secondary air supply apparatus or a method for the same, which can detect failure in the secondary air supply apparatus.

2. Description of the Related Art

A secondary air supply apparatus is known, which supplies an exhaust manifold of an engine with secondary air delivered under pressure from an air pump so that CO and HC in exhaust gas are burned and changed to $CO_2$ and $H_2O$ due to chemical reaction.

Japanese Patent Application Publication No. JP 2003-83048 discloses a secondary air supply apparatus in which it can be determined whether an abnormality has occurred in a component of the secondary air supply apparatus. The secondary air supply apparatus disclosed in the Japanese Patent Application Publication No. JP 2003-83048 includes a secondary air supply passage for supplying secondary air to a portion upstream of an exhaust gas control device in an exhaust system of an internal combustion engine; an opening/closing portion which opens/closes the secondary air supply passage; a check valve which is provided downstream of the opening/closing portion; a pressure sensor which is provided in the secondary air supply passage; and an abnormality detecting portion which detects an abnormality in the component based on a pressure value detected by the pressure sensor and a pressure change value. When the opening/closing portion is controlled so as to open and close the secondary air supply passage, the abnormality detecting portion drives an air pump, and detects a discharge pressure of the air pump, thereby detecting clogging of the secondary air supply passage.

In the secondary air supply apparatus disclosed in the Japanese Patent Application Publication No. JP 2003-83048, since the pressure value and the pressure change value are obtained using the pressure sensor, a failure mode of each component can be determined in detail based on combination of the pressure value and the pressure change value. Also, since the air pump is driven and it is determined whether the discharge pressure of the air pump decreases when the opening/closing portion is controlled to close the secondary air supply passage, it is possible to determine whether an abnormality has occurred in the air pump, and to determine whether the secondary air supply passage has been clogged, at the same time.

However, in the secondary air supply apparatus disclosed in the Japanese Patent Application Publication No. JP 2003-83048, it may not be possible to accurately determine whether an abnormality has occurred. The secondary air supply apparatus is made on the precondition that the opening/closing portion which opens/closes the secondary air supply passage; and the check valve which is provided downstream of the opening/closing portion are provided. However, no consideration is given to a secondary air supply apparatus having a configuration other than this configuration. Accordingly, in a secondary air supply apparatus having a configuration other than this configuration, it may not be possible to accurately determine whether an abnormality has occurred. Also, in the secondary air supply apparatus disclosed in the aforementioned publication, the air pump is driven and the discharge pressure of the air pump is detected, whereby it is determined whether the secondary air supply passage has been clogged, at the same time. However, it may be inappropriate to drive the air pump in some cases.

SUMMARY OF THE INVENTION

The invention is made in order to solve the aforementioned problem. Accordingly, it is an object of the invention to provide a secondary air supply apparatus or a control method for the same, which can accurately detect failure.

A first aspect of the invention relates to a secondary air supply apparatus for an internal combustion engine provided with plural cylinders, which supplies secondary air to a portion upstream of an exhaust gas control device. The secondary air supply apparatus includes an air pump which supplies air under pressure; a first air passage through which the air delivered under pressure from the air pump flows; a first opening/closing valve which opens/closes the first air passage; a second air passage which is connected to the first air passage at a portion downstream of the first opening/closing valve, and which is connected to an exhaust passage leading to a predetermined cylinder among the plural cylinders; a second opening/closing valve which opens/closes the second air passage; a third air passage which is connected to the first air passage at a portion downstream of the first opening/closing valve, and which is connected to an exhaust passage leading to a cylinder different from the predetermined cylinder to which the exhaust passage connected to the second air passage leads; a third opening/closing valve which opens/closes the third air passage; a pressure detector which performs detection of a pressure in the first air passage, the pressure detector being provided between the air pump and the first opening/closing valve; and a failure determining device which determines whether failure has occurred in the secondary air supply apparatus based on a result of the detection that is performed by the pressure detector while the first opening/closing valve is controlled so as to be opened, the second opening/closing valve and the third opening/closing valve are controlled so as to be closed, and the air pump is controlled so as to be stopped.

According to the first aspect of the invention, the first air passage is opened/closed by the first opening/closing valve, the second air passage is opened/closed by the second opening/closing valve, and the third air passage is opened/closed by the third opening/closing valve. The pressure in the first air passage is detected by the pressure detector that is provided between the air pump and the first opening/closing valve. The failure determining device determines whether failure has occurred in the secondary air supply apparatus based on the result of the detection performed by the pressure detector while the first opening/closing valve is controlled so as to be opened, the second opening/closing valve and the third opening/closing valve are controlled so as to be closed, and the air pump is controlled so as to be stopped. For example, when a change in the pressure is detected by the pressure detector, it can be determined that exhaust gas flows back to the first air passage via at least one of the second air passage and the third air passage. In this case, it can be considered that failure has occurred in at least one of the second opening/closing valve and the third opening/closing valve, and at least one of the second opening/closing valve and the third opening/closing valve remains in an opened state and cannot be closed. Therefore, when a change in the pressure is detected, it can be determined that failure has occurred in at least one of the second opening/closing valve and the third opening/closing valve, that is, failure in the secondary air supply apparatus can be detected. Thus, it is possible to accurately detect failure in the second opening/closing valve and the third opening/closing valve of the secondary air supply apparatus. Accordingly, it is possible to provide the secondary air supply apparatus which can accurately detect failure.

According to a second aspect of the invention, in the secondary air supply apparatus according to the first aspect of the invention, the failure determining device determines whether failure has occurred in the secondary air supply apparatus when an amount of air introduced into the internal combustion engine is larger than a predetermined amount.

According to the second aspect of the invention, when the amount of the air introduced into the internal combustion engine is larger than the predetermined amount, it may be determined whether failure has occurred in the secondary air supply apparatus. When the amount of the introduced air is large, the amount of exhaust gas is sufficiently large. Therefore, when at least one of the second opening/closing valve and the third opening/closing valve remains in the opened state and cannot be closed, an amplitude of a change in the pressure caused by exhaust gas flowing back to the first air passage becomes large. Therefore, when at least one of the second opening/closing valve and the third opening/closing valve remains in the opened state and cannot be closed, the pressure detecting device can accurately detect a change in the pressure. Thus, it is possible to improve accuracy of detecting failure in the secondary air supply apparatus. As a result, it is possible to accurately detect failure in the secondary air supply apparatus.

According to a third aspect of the invention, in the secondary air supply apparatus according to the first aspect or the second aspect of the invention, the failure determining device may determine that failure has occurred in the secondary air supply apparatus when a change in the pressure is detected by the pressure detector.

According to the third aspect of the invention, when a change in the pressure is detected by the pressure detector, it can be determined that the exhaust gas flows back to the first air passage via at least one of the second air passage and the third air passage. In this case, it can be considered that failure has occurred in at least one of the second opening/closing valve and the third opening/closing valve, that is, one of the second opening/closing valve and the third opening/closing valve remains in the opened state and cannot be closed. Accordingly, when a change in the pressure is detected, it can be determined that failure has occurred in at least one of the second opening/closing valve and the third opening/closing valve. That is, it is possible to detect failure in the secondary air supply apparatus. Thus, it is possible to accurately detect failure in the second opening/closing valve and the third opening/closing valve of the secondary air supply apparatus.

According to a fourth aspect of the invention, in the secondary air supply apparatus according to any one of the first aspect to the third aspect of the invention, the failure determining device may determines whether failure has occurred in at least one of the second opening/closing valve and the third opening/closing valve.

A fifth aspect of the invention relates to a secondary air supply apparatus for an internal combustion engine installed in a vehicle, which supplies secondary air to a portion upstream of an exhaust gas control device. The secondary air supply apparatus includes a pressure detector that performs detection of a pressure of air delivered under pressure from an air pump; an information obtaining device that obtains information relating to noise heard by an occupant of the vehicle; a pump operating device that operates the air pump when a magnitude of the noise is larger than a predetermined value; and a failure determining device that determines whether failure has occurred in the secondary air supply apparatus based on a result of the detection that is performed by the pressure detector while the air pump is controlled so as to be operated.

According to the fifth aspect of the invention, when the magnitude of the noise heard by the occupant of the vehicle is larger than the predetermined value, the air pump is operated. Thus, the air pump is operated in a situation where it is hard for the occupant to hear operating noise of the air pump due to other noise. Therefore, it is possible to reduce the possibility that the occupant feels uncomfortable due to the operating noise of the air pump. The pressure of the air delivered under pressure from the air pump is detected by the pressure detector. The failure determining device determines whether failure has occurred in the secondary air supply apparatus based on the result of the detection that is performed by the pressure detector while the air pump is controlled so as to be operated. For example, in a case where an increase in the pressure is not detected by the pressure detector even when the pressure of air is increased by operation of the air pump, it is determined that failure has occurred in the pressure detector. Thus, it is possible to detect failure in the secondary air supply apparatus, while reducing the possibility that the occupant feels uncomfortable due to the operating noise of the air pump. Accordingly, it is possible to accurately detect failure in the secondary air supply apparatus by appropriately operating the air pump. As a result, it is possible to provide the secondary air supply apparatus which can accurately detect failure.

According to a sixth aspect of the invention, in the secondary air supply apparatus according to the fifth aspect of the invention, the information relating to the noise includes at least one of a vehicle speed, a rotational speed of the internal combustion engine, and an opening amount of a throttle valve provided in the internal combustion engine.

According to the sixth aspect of the invention, it is possible to detect, as the information relating to the noise, at least one of the vehicle speed, the rotational speed of the internal combustion engine, and the opening amount of the throttle valve provided in the internal combustion engine.

According to a seventh aspect of the invention, in the secondary air supply apparatus according to the fifth aspect or the sixth aspect of the invention, the internal combustion engine is provided with plural cylinders. The secondary air supply apparatus may include i) a first air passage through which the air delivered under pressure from the air pump flows; ii) a first opening/closing valve which opens/closes the first air passage; iii) a second air passage which is connected to the first air passage at a portion downstream of the first opening/closing valve, and which is connected to an exhaust passage leading to a predetermined cylinder among the plural cylinders; iv) a second opening/closing valve which opens/ closes the second air passage; v) a third air passage which is connected to the first air passage at a portion downstream of the first opening/closing valve, and which is connected to an exhaust passage leading to a cylinder different from the predetermined cylinder to which the exhaust passage connected to the second air passage leads; and vi) a third opening/ closing valve which opens/closes the third air passage. The failure determining device may determine whether failure has occurred in the secondary air supply apparatus based on a result of the detection that is performed by the pressure detector while the first opening/closing valve, the second opening/closing valve, and the third opening/closing valve are controlled so as to be closed.

According to the seventh aspect of the invention, the first air passage is opened/closed by the first opening/closing valve, the second air passage is opened/closed by the second opening/closing valve, and the third air passage is opened/closed by the third opening/closing valve. The failure determining device determines whether failure has occurred in the secondary air supply apparatus based on a result of the detection that is performed while all the opening/closing valves are controlled so as to be closed. Thus, the air delivered under pressure from the air pump can be confined so that the pressure is increased. Accordingly, it is possible to determine whether failure has occurred in the secondary air supply apparatus based on whether the pressure detected by the pressure detector increases.

According to an eighth aspect of the invention, in the secondary air supply apparatus according to the seventh aspect of the invention, the failure determining device determines that failure has occurred in the secondary air supply apparatus when an increase in the pressure is not detected by the pressure detector.

According to the eighth aspect of the invention, when an increase in the pressure is not detected by the pressure detector in a situation where the pressure of the air delivered under pressure from the air pump should be increased, it can be determined that failure has occurred in the pressure detector. Accordingly, when an increase in the pressure is not detected by the pressure detector, it is possible to determine that failure has occurred in the secondary air supply apparatus.

According to a ninth aspect of the invention, in the secondary air supply apparatus according to any one of the fifth aspect to the eighth aspect of the invention, the failure determining device may determine whether failure has occurred in at least one of the pressure detector and the air pump.

BRIEF DESCRIPTION OF THE DRAWINGS

FIG. 2 is a flowchart showing a control structure of a program executed by an ECU of the secondary air supply apparatus according to the first embodiment of the invention;

FIG. 3 is a timing chart showing states of an air pump, an electromagnetic ASV, a vacuum pressure ASV (1), and a vacuum pressure ASV (2) that are controlled by the ECU of the secondary air supply apparatus according to the first embodiment of the invention; and FIG. 4 is a flowchart showing a control structure of a program executed by an ECU of a secondary air supply apparatus according to a second embodiment of the invention.

DETAILED DESCRIPTION OF THE EXEMPLARY EMBODIMENTS

Figure 1:
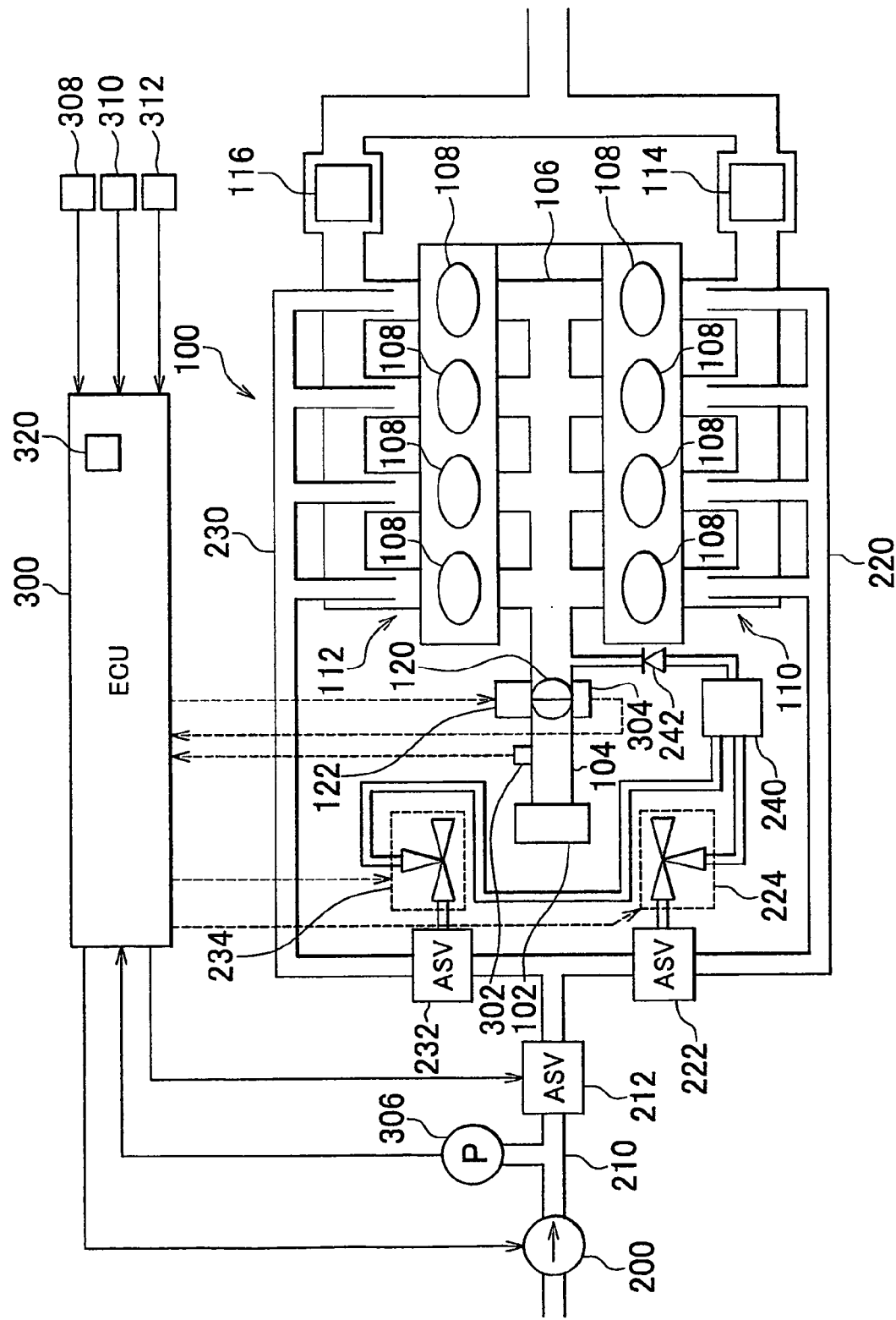
FIG. 1 is a control block diagram showing a secondary air supply apparatus according to a first embodiment of the invention.

Hereinafter, an embodiment of the invention will be described with reference to the drawings. In the following description, the same components are denoted by the same reference numerals, and names and functions thereof are the same. Therefore, detailed description thereof will not be repeated.

First Embodiment

Referring to FIG. 1, description will be made of a vehicle including a control apparatus for an internal combustion engine according to the embodiment of the invention. The vehicle includes an engine 100, and an electronic control unit (hereinafter, referred to as "ECU") 300. The secondary air supply apparatus according to the embodiment of the invention is realized, for example, by a program executed by the ECU 300.

The engine 100 is a V-type engine. The engine 100 is not limited to the V-type engine. Air is taken through an air cleaner 102, and then is introduced into the engine 100 via an intake pipe 104 and an intake manifold 106. The air is introduced into a combustion chamber of each of eight cylinders 108 from the intake manifold 106, together with fuel injected from an injector (not shown). The number of the cylinders is not limited to eight.

Air-fuel mixture introduced into each cylinder 108 is ignited by an ignition plug (not shown), and burned. Thus, the engine 100 generates driving force. The burned air-fuel mixture, that is, exhaust gas is guided to exhaust manifolds 110 and 112 that are connected to the cylinders 108. After purified by catalysts 114 and 116, the exhaust gas is discharged to the outside of the vehicle. An amount of air introduced into the engine 100 is controlled by a throttle valve 120. An opening amount of the throttle valve 120 is controlled by an actuator 122.

When the catalysts 114 and 116 are cold, the purifying capability of the catalysts 114 and 116 cannot be fully used. Therefore, secondary air is supplied to the exhaust manifolds 110 and 112. Since the secondary air is supplied, CO and HC in the exhaust gas are burned and changed to $CO_2$ and $H_2O$ due to chemical reaction.

In this embodiment of the invention, as the secondary air, air in an engine room is used. In order to supply the secondary air, an air pump 200 is provided. The air pump 200 delivers, under pressure, air in the engine room into a first air passage 210.

An electromagnetic air switching valve (hereinafter, referred to as "ASV") 212 is provided downstream of the air pump 200 in the first air passage 210. The state of the electromagnetic ASV 212 is selectively changed between an opened state and a closed state based on a control signal sent from the ECU 300. Thus, the electromagnetic ASV 212 can open/close the first air passage 210. A second air passage 220 and a third air passage 230 are connected to the first air passage 210.

One end of the second air passage 220 is connected to the first air passage 210 at a portion downstream of the electromagnetic ASV 212. The other end of the second air passage 220 is connected to the exhaust manifold 110 which is connected to one bank of the engine 100. That is, the other end of the second air passage 220 is connected to the exhaust passage leading to cylinders 108 provided in the one bank of the engine 100.

Similarly, one end of the third air passage 230 is connected to the first air passage 210 at a portion downstream of the electromagnetic ASV 212. The other end of the third air passage 230 is connected to the exhaust manifold 112 which is connected to the other bank of the engine 100. That is, the other end of the third air passage 230 is connected to the exhaust passage leading to cylinders 108 which are different from the cylinders 108 to which the exhaust passage connected to the second air passage 220 leads.

A vacuum pressure ASV (1) 222 is provided in the second air passage 220. The vacuum ASV (1) 222 is connected to a vacuum switching valve (hereinafter, referred to as "VSV") 224. Similarly, a vacuum pressure ASV (2) 232 is provided in the third air passage 230. The vacuum pressure ASV (2) 232 is connected to a vacuum switching valve (hereinafter, referred to as "VSV") 234.

The VSVs 224 and 234 are connected to a vacuum pressure tank 240. The vacuum pressure tank 240 is connected to an intake pipe 104 at a portion downstream of the throttle valve 120 via a check valve 242.

The check valve 242 allows air to flow from the vacuum tank 240 to the intake pipe 104. In addition, the check valve 242 prohibits the air from flowing from the intake pipe 104 to the vacuum pressure tank 240. Thus, a pressure in the vacuum pressure tank 104 becomes a vacuum pressure.

On the basis of the control signal sent from the ECU 300, the VSV 224 switches between a state in which the vacuum pressure is introduced from the vacuum pressure tank 240 to the vacuum pressure ASV (1) 222, and a state in which an atmospheric pressure is introduced to the vacuum pressure ASV (1) 222. In the case where the vacuum pressure is introduced from the vacuum pressure tank 240 to the vacuum pressure ASV (1) 222, the vacuum ASV (1) 222 is opened. In the case where the atmospheric pressure is introduced to the vacuum pressure ASV (1) 222, the vacuum pressure ASV (1) 222 is closed. Thus, the vacuum pressure ASV (1) 222 can open/close the second air passage 220.

Similarly, on the basis of the control signal sent from the ECU 300, the VSV 234 switches between a state in which the vacuum pressure is introduced from the vacuum pressure tank 240 to the vacuum pressure ASV (2) 232, and a state in which the atmospheric pressure is introduced to the vacuum pressure ASV (2) 232. In the case where the vacuum pressure is introduced from the vacuum pressure tank 240 to the vacuum pressure ASV (2) 232, the vacuum pressure ASV (2) 232 is opened. In the case where the atmospheric pressure is introduced to the vacuum pressure ASV (2) 232, the vacuum pressure ASV (2) 232 is closed. Thus, the vacuum pressure ASV (2) 232 can open/close the third air passage 230.

In a case where the electromagnetic ASV 212, the vacuum pressure ASV (1) 222, and the vacuum pressure ASV (2) 232 are opened, air delivered under pressure from the air pump 200 is supplied to the exhaust manifolds 110 and 112 via the first air passage 210, the second air passage 220, and the third air passage 230. Thus, secondary air is supplied to the exhaust passages connected to each cylinder 108.

The ECU 300 receives signals indicating results of detection performed by an air flow meter 302, a throttle valve opening amount sensor 304, a pressure sensor 306, a vehicle speed sensor 308, a crank position sensor 310, and a coolant temperature sensor 312.

The air flow meter 302 detects an amount of air introduced into the engine 100. The throttle valve opening amount sensor 304 detects a throttle valve opening amount. The pressure sensor 306 is provided between the air pump 200 and the electromagnetic ASV 212, and detects a pressure in the first air passage 210. The vehicle speed sensor 308 detects a rotational speed of a vehicle wheel (not shown). The ECU 300 detects a vehicle speed based on the rotational speed of the vehicle wheel detected by the vehicle speed sensor 308. The crank position sensor 310 detects a rotational speed of a crank shaft (not shown) of the engine 100, that is, an engine rotational speed NE. The coolant sensor 312 detects a temperature of coolant of the engine 100.

The ECU 300 performs computations based on the signals sent from the sensors, and maps and programs stored in memory 320. Thus, the ECU 300 controls devices installed in the vehicle so that the vehicle is brought into a desired state. Also, in this embodiment, the ECU 300 detects failure in the electromagnetic ASV 212, the vacuum pressure ASV (1) 222, and the vacuum pressure ASV (2) 232.

Referring to FIG. 2, description will be made of a control structure of a program executed by the ECU 300 of the secondary air supply apparatus according to this embodiment of the invention.

In step S100, the ECU 300 determines whether an AI (air injection) performing condition is satisfied. The term "AI (air injection)" signifies "delivering under pressure secondary air using the air pump 200 so that the secondary air is supplied to the exhaust manifolds 110 and 112 connected to each cylinder". The AI performing condition is the condition for performing AI. The AI performing condition includes conditions relating to a temperature of coolant of the engine 100, an elapsed time period since the engine 100 is started, an amount of air introduced into the engine 100, and the like. As the AI performing condition, a known ordinary condition is used. Therefore, detailed description thereof will be omitted. If the AI performing condition is satisfied ("YES" in step S100), step S102 is performed. If the AI performing condition is not satisfied ("NO" in step S100), step S200 is performed.

In step S102, the ECU 300 operates the air pump 200. In step S104, the ECU 300 opens the electromagnetic ASV 212. In step S106, the ECU 300 introduces the vacuum pressure from the vacuum pressure tank 240 to the vacuum pressure ASV (1) 222 using the VSV 224 so that the vacuum pressure ASV (1) 222 is opened. In step S108, the ECU 300 introduces the vacuum pressure from the vacuum pressure tank 240 to the vacuum pressure ASV (2) 232 using the VSV 234 so that the vacuum pressure ASV (2) 232 is opened.

In step S110, the ECU 300 determines whether an AI ending condition is satisfied. The AI ending condition is the condition for ending the AI. The AI ending condition includes conditions relating to an elapsed time period since the AI is started, a temperature of the catalyst 116, and the like. As the AI ending condition, a known ordinary condition is used. Therefore, detailed description thereof will be omitted. If the AI ending condition is satisfied ("YES" in step S110), step S112 is performed. If the AI ending condition is not satisfied ("NO" in step S110), step S110 is performed.

In step S112, the ECU 300 ends the AI. When the AI is ended, operation of the air pump 200 is stopped. The electromagnetic ASV 212, the vacuum pressure ASV (1) 222, and the vacuum pressure ASV (2) 232 are closed.

In step S114, the ECU 300 detects a back pressure against the air pump 200, that is, the pressure inside the first air passage 210, based on the signal sent from the pressure sensor 306. In step S116, the ECU 300 opens the electromagnetic ASV 212.

In step S118, the ECU 300 detects the back pressure against the air pump 200, that is, the pressure inside the first air passage 210, based on the signal sent from the pressure sensor 306. In step S120, the ECU 300 closes the electromagnetic ASV 212.

In step S200, the ECU 300 determines whether an air amount GA that is an amount of air introduced into the engine 100 is equal to or larger than a predetermined air amount GA (0), and a coolant temperature (temperature of coolant) TW at a starting time of the engine 100 is equal to or higher than a predetermined coolant temperature TW (0).

The air amount GA (0) is the amount at or above which a change in the pressure caused by exhaust gas flowing back to the first air passage 210 can be detected by the pressure sensor 306 when the electromagnetic ASV 212, the vacuum pressure ASV (1) 222, and the vacuum pressure ASV (2) 232 are in the opened state. For example, the coolant temperature TW (0) is the temperature corresponding to the temperature of the ECU 300 at which the ECU 300 can be operated.

If the air amount GA is equal to or larger than the predetermined air amount GA (0) and the coolant temperature TW at the starting time of the engine 100 is equal to or higher than the coolant temperature TW (0) ("YES" in step S200), step S202 is performed. If not ("NO" in step S200), the routine is ended. The routine may be configured such that step S202 is performed when a condition other than the condition relating to the air amount GA and the coolant temperature TW is satisfied, in addition to the condition relating to the air amount GA and the coolant temperature TW.

In step S202, the ECU 300 opens the electromagnetic ASV 212 while the air pump 200 is controlled so as to be stopped, and vacuum pressure ASV (1) 222 and the vacuum pressure ASV (2) 232 are controlled so as to be closed.

In step S204, the ECU 300 detects the back pressure against the air pump 200, that is, the pressure inside the first air passage 210 based on the signal sent from the pressure sensor 306. In step S206, the ECU 300 closes the electromagnetic ASV 212.

In step S300, the ECU 300 determines whether there is a pulsation of the pressure, that is, a change in the pressure while the air pump 200 is controlled so as to be stopped, and all of the electromagnetic ASV 212, the vacuum pressure ASV (1) 222, and the vacuum pressure ASV (2) 232 are controlled so as to be closed. If there is a change in the pressure ("YES" in step S300), step S302 is performed. If not ("NO" in step S300), step S400 is performed.

In step S302, the ECU 300 determines that failure has occurred in at least one of the vacuum pressure ASV (1) 222 and the vacuum pressure ASV (2) 232, and the electromagnetic ASV 212, that is, at least one of the vacuum pressure ASV (1) 222 and the vacuum pressure ASV (2) 232, and the electromagnetic ASV 212 remain in the opened state and cannot be closed.

In step S400, the ECU 300 determines whether there is a pulsation of the pressure, that is, a change in the pressure while the air pump 200 is controlled so as to be stopped, the vacuum pressure ASV (1) 222 and the vacuum pressure ASV (2) 232 are controlled so as to be closed, and the electromagnetic ASV 212 is opened. If there is a change in the pressure ("YES" in step S400), step S402 is performed. If not ("NO" in step S400), the routine is ended. In step S402, the ECU 300 determines that failure has occurred in at least one of the vacuum pressure ASV (1) 222 and the vacuum pressure ASV (2) 232, that is, at least one of the vacuum pressure ASV (1) 222 and the vacuum pressure ASV (2) 232 remains in the opened state and cannot be closed.

Hereinafter, description will be made of operation of the ECU 300 of the secondary air supply apparatus according to the embodiment of the invention, based on the structure and the flowchart that have been described above.

When a driver turns an ignition switch (not shown) on, and starts a vehicle system, it is determined whether the AI performing condition is satisfied (S1OO). If the AI performing condition is satisfied ("YES" in step S1OO), the air pomp 200 is operated at a time point T (1), as shown in FIG. 3 (S 102).

After the air pump 200 is operated, the electromagnetic ASV 212 is opened at a time point T (2) (S 104). Then, the vacuum ASV (1) 222 is opened at a time point T (3) (S 106). Then, the vacuum pressure ASV (2) 232 is opened at a time point t (4) (S 108).

Thus, the secondary air delivered under pressure from the air pump 200 is supplied to the exhaust manifolds 110 and 112 connected to each cylinder 108 via the first air passage 210, the second air passage 220, and the third air passage 230 (that is, the AI is performed).

In this situation, when the AI ending condition is satisfied ("YES" in step SI1O), the air pump 200 is stopped, and the electromagnetic ASV 212, the vacuum pressure ASV (1) 222, and the vacuum pressure ASV (2) 232 are closed. Thus, the AI is ended at a time point T (5) (S112).

After the AI is ended (S112), the pressure sensor 306 detects the pressure inside the first air passage 210 (S114). Then, the electromagnetic ASV 212 is opened at a time point T (6) (S 116), and the pressure inside the first air passage 210 is detected again (S 118). Then, the electromagnetic ASV 212 is closed at a time point T (7) (S 120).

If there is a pulsation of the pressure (change in the pressure) as shown by a dashed line in FIG. 3 while all of the electromagnetic ASV 212, the vacuum pressure ASV (1) 222, and the vacuum pressure ASV (2) 232 are controlled so as to be closed, that is, during a period from the time point T (5) to the time point T (6), it can be determined that exhaust gas flows back into the first air passage 210.

In this case, it can be considered that at least one of the vacuum pressure ASV (1) 222 and the vacuum pressure ASV (2) 232, and the electromagnetic ASV 212 remain in the opened state and cannot be closed. Accordingly, if there is a change in the pressure ("YES" in step S300), it is determined that failure has occurred in at least one of the vacuum pressure ASV (1) 222 and the vacuum pressure ASV (2) 232, and the electromagnetic ASV 212 (S302).

Also, even in the case where there is no change in the pressure during the period from the time point T (5) to the time point T (6) ("NO" in step S300), if there is a change in the pressure as shown by the dashed line in FIG. 3 while the air pump 200 is controlled so as to be stopped, the vacuum pressure ASV (1) 222 and the vacuum pressure ASV (2) 232 are controlled so as to be closed, and the electromagnetic ASV 212 is opened, that is, during the period from the time point T (6) to the time point T (7), it can be determined that the exhaust gas flows back into the first air passage 210.

In this case, it can be considered that at least one of the vacuum pressure ASV (1) 222 and the vacuum pressure ASV (2) 232 remains in the opened state and cannot be closed, and therefore the exhaust gas flows back to the first air passage 210 via at least one of the second air passage 220 and the third air passage 230.

Accordingly, if there is a change in the pressure ("YES" in step S400), it is determined that failure has occurred in at least one of the vacuum pressure ASV (1) 222 and the vacuum pressure ASV (2) 232 (S402).

Meanwhile, even in the case where the AI performing condition is not satisfied (S1OO), if the air amount GA that is the amount of the air introduced into the engine 100 is equal to or larger than the predetermined amount GA (0) and the coolant temperature at the starting time of the engine 100 is equal to or higher than the predetermined temperature TW (0) ("YES" in step S200), it is determined whether failure has occurred in at least one of the vacuum pressure ASV (1) 222 and the vacuum pressure ASV (2) 232.

In order to determine whether failure has occurred in at least one of the vacuum pressure ASV (1) 222 and the vacuum pressure ASV (2) 232, the electromagnetic ASV 212 is opened while AI is not being performed, that is, the air pump 200 is controlled so as to be stopped, and the vacuum pressure ASV (1) 222 and the vacuum pressure ASV (2) 232 are controlled so as to be closed (S202).

In this situation, the pressure sensor 306 detects the pressure inside the first air passage 210 (S204), and the electromagnetic ASV 212 is closed (S206). If there is a change in the pressure during a period from when the electromagnetic ASV 212 is opened until when the electromagnetic ASV 212 is closed, it can be determined that the exhaust gas flows back into the first air passage 210.

In this case, it can be considered that at least one of the vacuum pressure ASV (1) 222 and the vacuum pressure ASV (2) 232 remains in the opened state and cannot be closed, and therefore the exhaust gas flows back into the first air passage 210 via at least one of the second air passage 220 and the third air passage 230.

Accordingly, if there is a change in the pressure ("YES" in step S400), it is determined that failure has occurred in at least one of the vacuum pressure ASV (1) 222 and the vacuum pressure ASV (2) 232 (S402).

At this time, the air amount GA that is the amount of the air introduced into the engine 100 is equal to or larger than the predetermined amount GA (0). Therefore, the amount of the exhaust gas becomes sufficiently large, and an amplitude of a change in the pressure detected by the pressure sensor 306 becomes large. Accordingly, the pressure sensor 306 can accurately detect a change in the pressure. Thus, it is possible to accurately detect failure in the vacuum pressure ASV (1) 222 and the vacuum pressure ASV (2) 232.

As described above, the ECU of the secondary air supply apparatus according to the embodiment of the invention opens the electromagnetic ASV in the case where the air amount GA that is the amount of the air introduced into the engine is equal to or larger than the predetermined air amount GA (0). At this time, the air pump is controlled so as to be stopped, and the vacuum pressure ASV (1) and the vacuum pressure ASV (2) are controlled so as to be closed. In this situation, if a change in the pressure is detected by the pressure sensor, the ECU 300 determines that failure has occurred in at least one of the vacuum pressure ASV (1) and the vacuum pressure ASV (2), that is, at least one of the vacuum pressure ASV (1) and the vacuum pressure ASV (2) remains in the opened state and cannot be closed. Thus, in the secondary air supply apparatus in which the vacuum pressure ASV (1) and the vacuum pressure ASV (2) are provided instead of a check valve, it is possible to detect failure in the vacuum pressure ASV (1) and the vacuum pressure ASV (2).

Second Embodiment

Referring to FIG. 4, a second embodiment of the invention will be described. In the aforementioned first embodiment, the ECU detects failure in the electromagnet ASV, the vacuum pressure ASV (1), and the vacuum pressure ASV (2). In the second embodiment, the ECU 300 detects failure in the pressure sensor 306. Other portions of the configuration in the second embodiment are the same as in the aforementioned first embodiment, and functions thereof are the same as in the aforementioned first embodiment. Therefore, detailed description thereof will not be repeated.

Referring to FIG. 4, description will be made of a program executed by the ECU 300 of the secondary air supply apparatus according to the second embodiment of the invention. The ECU 300 executes a program described below, in addition to the program in the aforementioned first embodiment.

In step S500, the ECU 300 determines whether the AI is unperformed. The sentence "the AI is unperformed" signifies that the aforementioned AI performing condition is not satisfied. If the AI is unperformed ("YES" in step S500), step S502 is performed. If not ("NO" in step S500), the routine is ended.

In step S502, the ECU 300 determines whether all of a condition that a vehicle speed V is equal to or higher than a predetermined vehicle speed V (0), a condition that an engine rotational speed NE is equal to or higher than a predetermined rotational speed NE (0), and a condition that a throttle valve opening amount TH is equal to or larger than a predetermined opening amount TH (0) are satisfied. If all of the condition that the vehicle speed V is equal to or higher than the predetermined vehicle speed V (0), the condition that the engine rotational speed NE is equal to or higher than the predetermined rotational speed NE (0), and the condition that the throttle valve opening amount TH is equal to or larger than the predetermined opening amount TH (0) are satisfied ("YES" in step S502), step S504 is performed. If not ("NO" in step S502), the routine is ended.

The routine may be configured such that step S504 is performed when at least one of the condition that the vehicle speed V is equal to or higher than the predetermined vehicle speed V (0), the condition that the engine rotational speed NE is equal to or higher than the predetermined rotational speed NE (0), and the condition that the throttle valve opening amount TH is equal to or larger than the predetermined opening amount TH (0) is satisfied.

In step S504, the ECU 300 operates the air pump 200. In step S506, the ECU 300 detects the back pressure against the air pump 200, that is, the pressure inside the first air passage 210, based on the signal sent from the pressure sensor 306.

In step S508, the ECU 300 determines whether the pressure detected by the pressure sensor 306 has increased. If the pressure has increased ("YES" in step S508), step S510 is performed. If not ("NO" in step S508), step S512 is performed.

In step S510, the ECU 300 determines that the pressure sensor 306 is normal. In step S512, the ECU 300 determines that failure has occurred in the pressure sensor 306. At this time, "failure in the pressure sensor 306" signifies "failure in at least one of the pressure sensor 306 and the air pump 200".

Hereinafter, description will be made of operation of the ECU 300 according to this embodiment of the invention, based on the structure and the flowchart that have been described.

While the vehicle system is being started, in the case where the AI performing condition is not satisfied, and the AI is unperformed ("YES" in step S500), it is determined whether all of the condition that the vehicle speed V is equal to or higher than the predetermined vehicle speed V (0), the condition that the engine rotational speed NE is equal to or higher than the predetermined rotational speed NE (0), and the condition that the throttle valve opening amount TH is equal to or larger than the predetermined opening amount TH (0) are satisfied.

If all of the condition that the vehicle speed V is equal to or higher than the predetermined vehicle speed V (0), the condition that the engine rotational speed NE is equal to or higher than the predetermined rotational speed NE (0), and the condition that the throttle valve opening amount TH is equal to or larger than the predetermined opening amount TH (0) are satisfied ("YES" in step S502), the air pump 200 is operated (S504).

If the air pump 200 is operated when the AI is unperformed, that is, the electromagnetic ASV 212, the vacuum pressure ASV (1) 222, and the vacuum pressure ASV (2) 232 are in the closed state, air delivered under pressure from the air pump 200 is confined in the first air passage 210. Therefore, operating noise of the air pump 200 becomes large. Accordingly, an occupant may feel uncomfortable due to the operating noise of the air pump 200.

However, when the vehicle speed V is equal to or higher than the predetermined vehicle speed V (0), the engine rotational speed NE is equal to or higher than the predetermined rotational speed NE (0), and the throttle valve opening amount TH is equal to or larger than the predetermined opening amount TH (0), road noise, and the operating noise and the exhaust noise of the engine 100 are large. When the air pump 200 is operated in such a situation, it becomes hard for the occupant to hear the operating noise of the air pump 200 due to the road noise, and the operating noise and the exhaust noise of the engine 100. Therefore, it is possible to reduce the possibility that the occupant feels uncomfortable due to the operating noise of the air pump 200.

When the air pump 200 is operated (S504), the pressure inside the first air passage 210 is detected (S506). Since the air is delivered under pressure when the air pump 200 is operated, the pressure inside the first air passage 210 increases. Therefore, if the pressure sensor 306 is normal, the pressure detected by the pressure sensor 306 increases.

Accordingly, if the pressure has increased ("YES" in step S508), it is determined that the pressure sensor 306 is normal (S510). Meanwhile, if the pressure has not increased ("NO" in step S508), it is determined that failure has occurred in the pressure sensor 306.

As described above, in this embodiment, when the vehicle speed V is equal to or higher than the predetermined vehicle speed V (0), the engine rotational speed NE is equal to or higher than the predetermined rotational speed NE (0), and the throttle valve opening amount TH is equal to or larger than the predetermined opening amount TH (0), the air pump is operated and it is determined whether failure has occurred in the pressure sensor. Thus, the operating noise of the air pump can be drowned out by the road noise, and the operating noise and exhaust noise of the engine. As a result, it is possible to reduce the possibility that the occupant feels uncomfortable due to the operating noise of the air pump.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A secondary air supply apparatus for an internal combustion engine provided with plural cylinders, which supplies secondary air to a portion upstream of an exhaust gas control device, the apparatus comprising:
    an air pump which supplies air under pressure;
    a first air passage through which the air delivered under pressure from the air pump flows;
    a first opening/closing valve which opens/closes the first air passage;
    a second air passage one end of which is connected to the first air passage at a portion downstream of the first opening/closing valve, and the other end of which is connected to an exhaust passage leading to a predetermined cylinder among the plural cylinders;
    a second opening/closing valve which opens/closes the second air passage;
    a third air passage one end of which is connected to the first air passage at a portion downstream of the first opening/closing valve, and the other end of which is connected to an exhaust passage leading to a cylinder different from the predetermined cylinder to which the exhaust passage connected to the second air passage leads;
    a third opening/closing valve which opens/closes the third air passage;
    a pressure detector that performs detection of a pressure in the first air passage, the pressure detector being provided between the air pump and the first opening/closing valve; and
    a failure determining device that determines whether failure has occurred in the secondary air supply apparatus based on a result of the detection that is performed by the pressure detector while the first opening/closing valve is controlled so as to be opened, the second opening/closing valve and the third opening/closing valve are controlled so as to be closed, and the air pump is controlled so as to be stopped.

2. The secondary air supply apparatus according to claim 1, wherein the failure determining device determines whether failure has occurred in the secondary air supply apparatus when an amount of air introduced into the internal combustion engine is larger than a predetermined amount.

3. The secondary air supply apparatus according to claim 1, wherein the failure determining device determines that failure has occurred in the secondary air supply apparatus when a change in the pressure is detected by the pressure detector.

4. The secondary air supply apparatus according to claim 1, wherein the failure determining device determines whether failure has occurred in at least one of the second opening/closing valve and the third opening/closing valve.

5. A secondary air supply method for controlling secondary air supplied to a portion upstream of an exhaust gas control device, the method comprising:
    providing an air pump which supplies air under pressure; a first opening/closing valve which opens/closes the first air passage through which the air delivered under pressure from the air pump flows; a second opening/closing valve which opens/closes the second air passage which is connected to the first air passage at a portion downstream of the first opening/closing valve, and which is connected to an exhaust passage leading to a predetermined cylinder among the plural cylinders; and a third opening/closing valve which opens/closes the third air passage which is connected to the first air passage at a portion downstream of the first opening/closing valve, and which is connected to an exhaust passage leading to a cylinder different from the predetermined cylinder to which the exhaust passage connected to the second air passage leads;
    detecting a pressure in the first air passage between the air pump and the first opening/closing valve; and
    determining whether failure has occurred in the secondary air supply apparatus based on a result of the detection that is performed by the pressure detector while the first opening/closing valve is controlled so as to be opened, the second opening/closing valve and the third opening/closing valve are controlled so as to be closed, and the air pump is controlled so as to be stopped.

* * * * *

UNITED STATES PATENT AND TRADEMARK OFFICE
CERTIFICATE OF CORRECTION

PATENT NO. : 8,015,804 B2
APPLICATION NO. : 10/578747
DATED : September 13, 2011
INVENTOR(S) : Tomokazu Muraguchi It is certified that error appears in the above-identified patent and that said Letters Patent is hereby corrected as shown below:

| Column | Line | |
|---|---|---|
| 8 | 7 | Change "step S1OO," to --step S100,--. |
| 8 | 12-13 | Change "performing AL" to --performing Al.--. |
| 8 | 20 | Change "step S1OO)," to --step S100),--. |
| 8 | 22 | Change "step S1OO)," to --step S100),--. |
| 8 | 33 | Change "step SI1O," to --step S110,--. |
| 8 | 39 | Change "step SHO)," to --step S110),--. |
| 8 | 41 | Change "step SI1O), step SI1O" to --step S110), step S110--. |
| 9 | 58 | Change "(S1OO)." to --(S100).--. |
| 9 | 59 | Change "step S1OO)," to --step S100),--. |
| 10 | 5 | Change "step SI1O)," to --step S110),--. |
| 10 | 51 | Change "(S1OO)," to --(S100),--. |

Signed and Sealed this
Twenty-eighth Day of February, 2012

David J. Kappos
*Director of the United States Patent and Trademark Office*